No. 639,111. Patented Dec. 12, 1899.
J. M. TAGUE.
LISTED CORN CULTIVATOR.
(Application filed June 14, 1899.)
(No Model.)

WITNESSES:
Jos. A. Ryan
F. S. Stitt

INVENTOR
Joseph M. Tague
BY Munn & Co.
ATTORNEYS.

UNITED STATES PATENT OFFICE.

JOSEPH M. TAGUE, OF CAMBRIDGE, NEBRASKA, ASSIGNOR OF ONE-HALF TO CHARLES J. HALL AND DAVID F. NEISWANGER, OF SAME PLACE.

LISTED-CORN CULTIVATOR.

SPECIFICATION forming part of Letters Patent No. 639,111, dated December 12, 1899.

Application filed June 14, 1899. Serial No. 720,493. (No model.)

*To all whom it may concern:*

Be it known that I, JOSEPH M. TAGUE, of Cambridge, in the county of Furnas, and State of Nebraska, have invented a new and useful Improvement in Listed-Corn Cultivators, of which the following is a specification.

My invention relates to cultivators, and particularly to that class adapted for cultivating listed corn.
The object of the invention is to provide a cultivator of this class which is capable of efficient adjustment, which can be easily guided in the furrow, and in which the driver's weight may be advantageously utilized to bear more or less on the disks.

Figure 1:
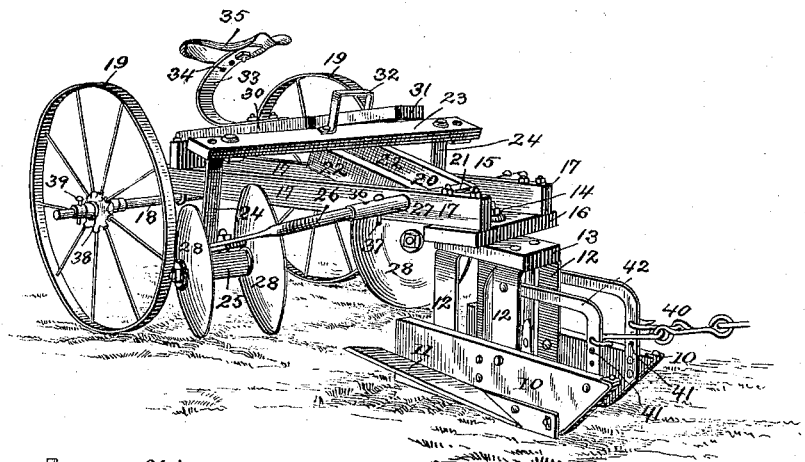
Figure 2:
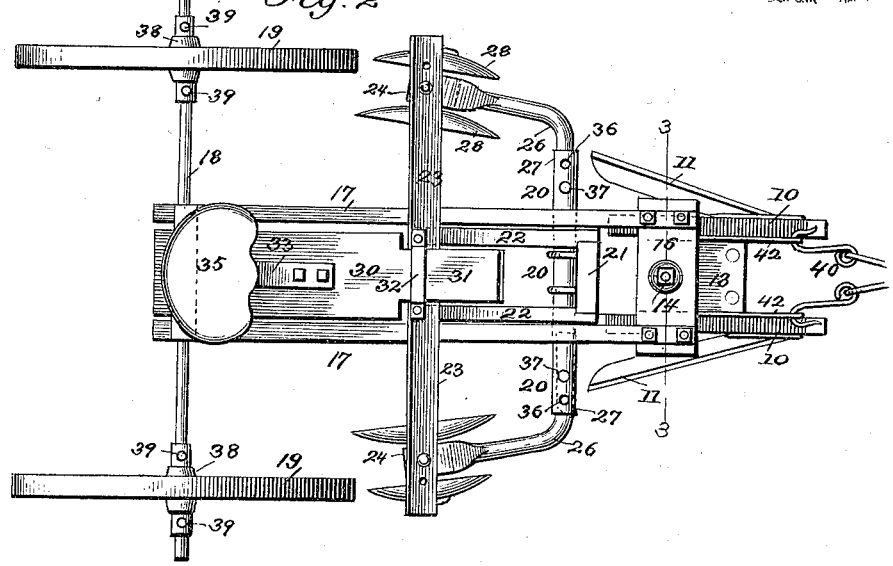
Figure 3:
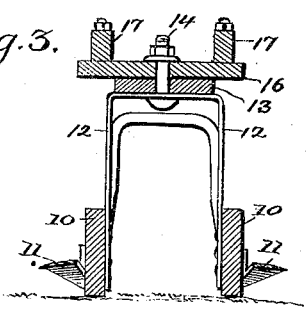

The invention consists in certain details of construction and combination of parts which I shall first describe, and then point out in the appended claims.
Figure 1 is a perspective view of my improved cultivator. Fig. 2 is a top plan view of the same. Fig. 3 is a detail section taken on line 3 3, Fig. 2.

The sled-runners 10, carrying the weed-knives 11, which are adjustable thereon, are rigidly connected together by two inverted-U-shaped standards 12. On the horizontal portions of such standards is supported a bolster-plate 13, through which the pivot-bolt 14 extends. By means of this bolt the sled is swiveled underneath the front end of the main frame 15 of the cultivator, the said frame consisting of the cross-bar 16, which receives the bolt 14, and the rearwardly-extending parallel side bars 17, secured rigidly to the cross-bar 16 at their forward ends and having their rear ends resting upon and secured to the supporting-axle 18, on which the traveling wheels 19 are journaled.
Pivotally mounted on the main frame 15 of the cultivator is the disk-carrying frame 20, which consists of a cross-bar 21 and rearwardly-extending side bars 22, lying, preferably, within the side bars 17 of the main frame, the rear ends of the bars 22 being rigidly connected to and supporting a rear cross-bar 23, which extends some distance beyond such side of the main frame. Disk-arms 24 depend from the ends of the cross-bar 23 and at their lower ends are connected to the disk-boxes 25, and thence extend at an angle toward the pivoted front end of the disk-carrying-frame 20, the forward ends of the arms being given a sharp bend inward, as at 26, and having such bent ends inserted in the ends of the main frame and rigidly fixed in the side bars of the disk-carrying frame.

As shown in the drawings, I preferably use twin disks 28, the outer disk of each pair being smaller than the inner, and they are placed on such a slant that the edges of all the disks are level when they are let down on the ground.

It is one of the main objects of my invention to utilize the weight of the driver in regulating the throw of the disks, and for this purpose I provide the platform 30, fixedly secured at its rear end to the main frame and formed with a reduced forward end 31, loosely inserted through a loop 32, attached to the rear cross-bar 23. On this platform the curved standard 33 is secured and at its upper end is provided with a plurality of apertures 34, any one of which is adapted to receive a bolt extending from the driver's seat 35, so that the weight of the driver may be placed at different points along the platform to cause the forward end of the same to bear more or less on the rear cross-bar 23, as desired.

The ends of the tube 27, which receive the bent ends of the disk-arms 24, are formed with a number of apertures 36, through which and corresponding apertures in the said ends of the arms pins 37 are adapted to fit, whereby to throw the disks out or in, as desired. To enable the traveling wheels to follow in the furrow of the outside disks, I mount the former on the axle by means of adjustable boxes 38, held at the desired points on the axle by pins 39, fitting in registering apertures in the boxes and axle.

The draft-hooks are designated 40 and are adapted to be inserted in apertures 41 in the angular braces 42, secured to the sled-runners 11 and the foremost standard 12. By providing a plurality of the apertures 41 the draft can be raised or lowered, as desired.

It is manifest that my arrangement of swiveling the connected sled-runners to the main traveling frame enables the cultivator to follow the lister-furrow more easily than if the disks were mounted directly upon the runners or if the connection between the frame and sled were a rigid one, and the cultivator is very easily guided. It is also clear that by pivotally mounting the disk-carrying frame on the main frame the disks are enabled to readily pass over any obstacle that may be in their way, while the weight of the driver can be thrown on the rear cross-bar of the disk-carrying frame whenever it is desired to bear down on the disks.

Having thus described my invention, what I claim as new, and desire to secure by Letters Patent, is—

1. In a cultivator, the sled-runners, the main frame swiveled on said runners at its forward end and having a wheel-supported rear end, a disk-carrying frame pivotally mounted on the main frame, and means, substantially as described, for throwing the driver's weight more or less on the disk-carrying frame, as set forth.

2. In a cultivator, the combination with the main frame, of the disk-carrying frame having one end pivotally secured to said main frame and extending rearwardly from such end, and a driver's platform supported at its rear on the main frame and having its front end loosely resting upon the rear end of the disk-carrying frame, as set forth.

3. In a cultivator, the combination with the main frame, of the disk-carrying frame having its forward end pivotally secured to the main frame and having a cross-bar at its rear end extending beyond each side of the main frame, disk-arms depending from the ends of such bar and carrying cultivator-disks, the arms extending forward from said disks and having inwardly-bent ends, a tube inserted through the main frame and disk-frame and receiving in its ends the bent ends of the arms, and means for adjusting the arms in the tube, as set forth.

4. A listed-corn cultivator, consisting of sled-runners, a main frame swiveled on said sled-runners at its forward end, cultivator-disks adjustably mounted on the said frame, the rear end of the said frame being supported on an axle and wheels on said axle, and means for adjusting the wheels on axle, as and for the purpose set forth.

JOSEPH M. TAGUE.

Witnesses:
D. F. NEISWANGER,
M. E. SULLIVAN.